US006741682B1

(12) United States Patent
Krenn et al.

(10) Patent No.: US 6,741,682 B1
(45) Date of Patent: May 25, 2004

(54) METHOD, COMPUTER SYSTEM AND PROGRAM FOR PROCESSING BETS AND GAMES OF CHANCE

(75) Inventors: Kurt Krenn, Salzburg (AT); Helmut Buchner, Hochburg-Ach (AT); Detlef Train, Augustinegrasse 15a, A-5020 Salzburg (AT)

(73) Assignee: Detlef Train, Salzburg (AU)

(*) Notice: Subject to any disclaimer, the term of this patent is extended or adjusted under 35 U.S.C. 154(b) by 0 days.

(21) Appl. No.: 10/018,601

(22) PCT Filed: May 25, 2000

(86) PCT No.: PCT/AT00/00149

§ 371 (c)(1),
(2), (4) Date: Dec. 17, 2001

(87) PCT Pub. No.: WO01/01360

PCT Pub. Date: Jan. 4, 2001

(30) Foreign Application Priority Data

Jun. 23, 1999 (AT) .............................................. 1108/99

(51) Int. Cl.[7] .............................................. H04M 11/00
(52) U.S. Cl. ............................... 379/93.13; 379/93.26; 379/88.18; 463/17
(58) Field of Search ........................... 379/93.13, 93.02, 379/93.03, 93.26, 88.13, 88.16, 88.18; 463/17, 25, 41; 273/139

(56) References Cited

U.S. PATENT DOCUMENTS

| | | | | |
|---|---|---|---|---|
| 4,922,522 A | * | 5/1990 | Scanlon | 463/17 |
| 5,083,272 A | | 1/1992 | Walker et al. | 364/412 |
| 5,164,981 A | | 11/1992 | Mitchell et al. | 379/88 |
| 5,354,069 A | * | 10/1994 | Guttman et al. | 463/25 |
| 5,415,416 A | | 5/1995 | Scagnelli et al. | 273/439 |
| 5,608,785 A | | 3/1997 | Kasday | 379/90 |
| 5,679,077 A | | 10/1997 | Pocock et al. | 463/19 |
| 5,910,047 A | | 6/1999 | Scagnelli et al. | 463/17 |

FOREIGN PATENT DOCUMENTS

| | | | | | |
|---|---|---|---|---|---|
| CA | 1162336 A | * | 2/1984 | G06F/15/28 |
| EP | 0480622 A2 | | 4/1992 | H04M/3/50 |
| WO | WO89/02139 | | 3/1989 | G07C/15/00 |
| WO | WO98/42117 | | 9/1998 | H04M/3/50 |
| WO | WO01/01360 | | 1/2001 | G07F/17/32 |

* cited by examiner

*Primary Examiner*—Wing Fu Chan
(74) *Attorney, Agent, or Firm*—Fitch, Even, Tabin & Flannery; George H. Spencer; Norman N. Kunitz

(57) ABSTRACT

Method, computer system and program for processing over the telephone net bets and games of chance including placements of bets and winning requests, comprising:

a data base;

call distribution means (ACD) connected to the telephone net for receiving incoming calls and distributing to a plurality of processing queues ($Q_1$–$Q_K$), and a number N of listening and speaking terminals ($P_1$–$P_M$) connected to M first processing queues (Q);

means ($ASR_1$–$ASR_N$) for evaluating a caller identification of a caller, a number N of speech recognition modules connected to N second processing queues (Q) for converting one or more bet placements of the caller into a machine processable set of data and storing it in the data bank together with the caller identity, and\ a selective evaluation device ($ASR_i$, S) connected to the call distribution means (ACD) and, dependent of the input selection by the caller, controls the caller recognition means (ACD) to direct the call to a speech recognition module (ASR) in case placement of a bet has been selected, or to a listening and speaking terminal (P) in case of a request for winnings.

13 Claims, 7 Drawing Sheets

METHOD, COMPUTER SYSTEM AND PROGRAM FOR PROCESSING BETS AND GAMES OF CHANCE

BACKGROUND OF THE INVENTION

1. Field of the Invention

The present invention relates to a method of processing, via a telephone net, bets and games of chance which include the placing of bets and requests for winnings, utilizing a computer system communicating with the telephone net and provided with a data base as well as with listening and speaking terminals.

Furthermore, the invention relates to a computer system for processing, via a telephone net, bets and games of chance which include the placing of bets and requests for winnings, comprising:

a data base, call distribution means (ACD) connected to the telephone net for receiving incoming calls and for distributing them to a plurality of processing queues ($Q_1$–$Q_K$), and a number M of listening and speaking terminals ($P_1$–$P_M$) connected to M first processing queues (Q).

Moreover, the invention relates to a program for controlling a computer system communicating with a telephone net and connected to a data base as well as listening and speaking terminals.

Such systems are known as computer-assisted call centers. Incoming calls are distributed by the computer system to employees working at work stations equipped with listening and speaking terminals. The computer system may present to a caller voice selection menus which the caller acknowledges or controls by touch tone inputs (MFV) in order to reach a certain employee.

The operation of such call centers is particularly uneconomical when used in connection with bets and games of chance: Shortly before the bets or games of chance are closed, there usually occurs an explosion-like increase in the number of incoming calls so that a correspondingly proportional number of working stations for employees and an equal number of employees would have to be provided. However, between bets or games of chance a large number of working stations would be idle during substantial increments of time.

2. The Prior Art

For that reason, systems have previously been proposed for processing incoming calls completely automatically. U.S. Pat. No. 5,415,416 describes a computerized system for receiving lottery bets via a telephone net, with a speech menu system which is controlled completely, up to the push button inputs (MFV) of credit card numbers and voice responses to the caller, by the caller using push button inputs (MFV). However, this system is only suitable for placing bets and is incapable of processing winning requests. Initial enrollment as a new customer requires registration with an employee at a listening and speaking terminal.

It is this user interface which constitutes a critical point in the acceptance of such an automated service. A large number of potential users considers an interaction with the system by way of push button inputs tiresome and prone to input errors, so that it avoids such services.

On the other hand, voice controlled menu systems for telephone systems are known which utilize automatic speech recognition methods enabling an input from the caller of natural voice commands and data.

In applications of betting and games of chance which include requests for winnings the problem arises that for purposes of possible winning requests the addresses of all callers have heretofore been stored. However, given the state of development of currently available speaker-independent speech recognition methods, speech recognition of a substantially unlimited worldwide set of addresses cannot be accomplished within a realistic calculation time. Only for a limited geographical area of potential customers, for example, addresses from an area of about 100,000 inhabitants, would it be possible to realize speech recognition. However, in the case of a geographical area of customers from all of Germany, the system would have to be capable of recognizing about 80 million addresses.

Since the target group of telephone supported automatic betting and game of chance systems is basically directed to potential new customers in an unlimited geographical area, a problem arises which cannot at present be solved. On the one hand, it is uneconomical, because of the irregularity of peak demands, to increase the number of workstations for customer registrations by employees; on the other hand, currently available speech recognition technology is incapable of mastering this task.

OBJECT OF THE INVENTION

It as an object of the invention to provide a computer system and a program for this purpose which is capable of providing, at a reasonable economic investment, a substantially automated system for processing the placing of bets and requests for winnings in wagerings and games of chance.

SUMMARY OF THE INVENTION

In a first aspect of the invention, the object is accomplished by a method which is characterized by the steps of:

a) making available in a data base a first limited set of predetermined speech component patterns forming possible spoken bet placements;

b) receiving an incoming call by the computer system;

c) automatically evaluating the caller identification of the caller including preceding or succeeding d) recognition of the caller's selection between placing a bet, on the one hand, or requesting a winning on the other hand, and, independently of the recognition, selecting d1) converting one of more bet placements by the caller with the aid of a speech recognition method which performs a comparison against the first set of speech component patterns, to a machine processable set of data and storing the set of data together with the caller identification in the data base; or d2) conveying the call to a listening and speaking terminal in case of a request for a winning.

In the present specification the term "bet placement" connotes every kind of participation in wagering, book making, games of chance, lottery or the like whether it be betting, wagering, playing or placing a stake, etc. The term "bet placement" includes all possible variants of participation.

In a second aspect of the invention the object is accomplished with a computer system of the kind referred to supra which is characterized by:

means ($ASR_1$–$ASR_N$) for evaluating the caller identification of a caller;

a number N of speech recognition modules (ASR1–$ASR_N$) connected to N second processing queues (Q) for converting each spoken bet placement of the caller into a machine processessable set of data and storing it, together with the caller identification, in the data base;

a selective evaluation device ($ASR_i$, S) connected to the call distribution means (ACD) for controlling, dependent upon the input selection by the caller, the call distribution means (ACD) to direct the call to one of the speech recognition modules (ASR) in case a bet placement has been selected, or to a listening and speaking terminal (P) in case a request for a winning has been selected.

The invention proposed an entirely novel approach for automatically processing bets and games of chance over the telephone net: The invention is based upon the surprising recognition of the basic need for distinguishing between game participation over the telephone for placing a bet or to request a winning, and the realization that in the former case speech recognition of the address of a caller is not necessary at all. In this manner, currently available speech recognition technology may be fully utilized, and the number of work-intensive work stations provided with listening and speaking terminals may be reduced by the factor (M+N):M.

An especially preferred embodiment of the method in accordance with the invention is characterized by the fact that in step c) a new caller identification is generated and voice-issued in case a caller identification can either not be evaluated or not be found. In this fashion, new customer may immediately participate in a game and make use of the complete utility of the system.

In accordance with a preferred embodiment of the invention the automatic evaluation of the caller identification may proceed on the basis of the caller's telephone number as transmitted by a public telephone net. If the caller identification is not transmitted by the telephone net or if a permanent association of game participants with defined telephone connections is not desirable, automatic evaluation of the caller identification may be performed by a speech recognition method which performs a comparison with a second limited set of predetermined speech component patterns forming possible spoken caller identities. The caller identification is in any case independent of an address and can, therefore, be evaluated by currently available speech recognition methods.

Preferably, for purposes of increasing security, the caller identification includes an account number and a password.

A further advantageous embodiment of the invention is characterized by the steps of making available a third limited set of predetermined speech component patterns forming possible spoken credit card charge, bank account deduction transactions or the like, and converting a spoken credit card charge, bank account deduction transaction or the like of the caller's by means of a speech recognition method which executes a comparison with the third set of speech component patterns, into a machine-processable set of transactions which is stored with the caller identification in a data base. In this manner, crediting and identifying a caller may be automatically performed at the same time so that for the time being an anonymous betting account may be set up for the caller.

Crediting the betting account may also take place by debiting a bank account, payment through a telephone or electricity bill, automatic bank payment, electronic species, customer cards, value cards, vouchers etc. In the present specification the terms "credit card, bank account or the like", "credit card issuer, bank, or the like" include all these variants.

To increase security for the operator, the sets of transactions in the data base are preferably examined for credit worthiness by way of a credit card and bank account verification terminals or the like.

There are two preferred variants for recognizing the caller's selection in step d). On the one hand, the selection may take place by a telephone dialing number determined by the telephone net and which presents itself to the caller in the manner of an extension, so that the caller may make his basic selection between placing a bet and requesting a winning as soon as he places a call to the system. On the other hand, the selection in step d) may take place by voice command and speech recognition, so that the system presents itself to the outside by a telephone number followed by voice control.

Other objects will in part be obvious and will in part appear hereinafter.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

Figure 3A:
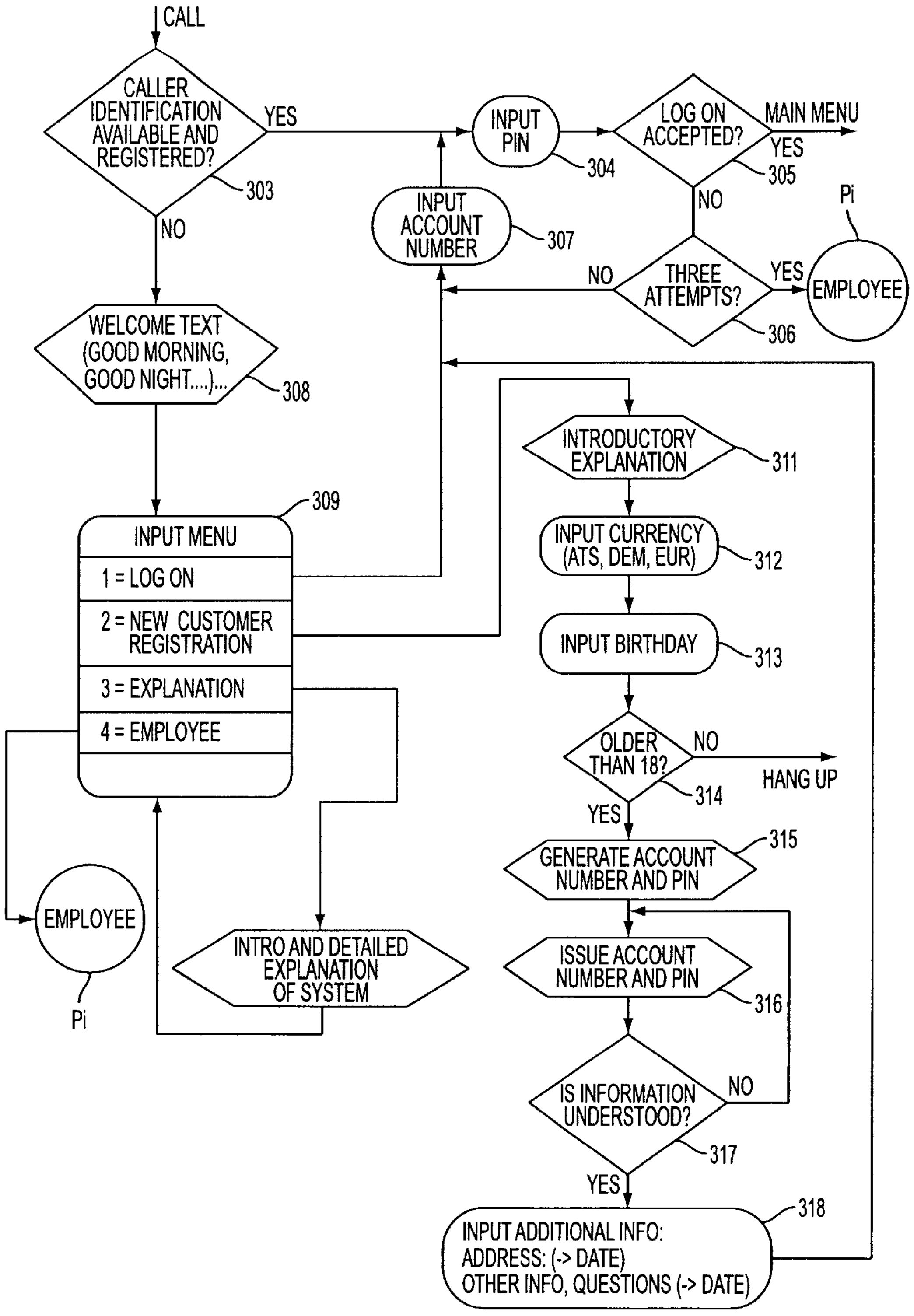
Figure 3B:
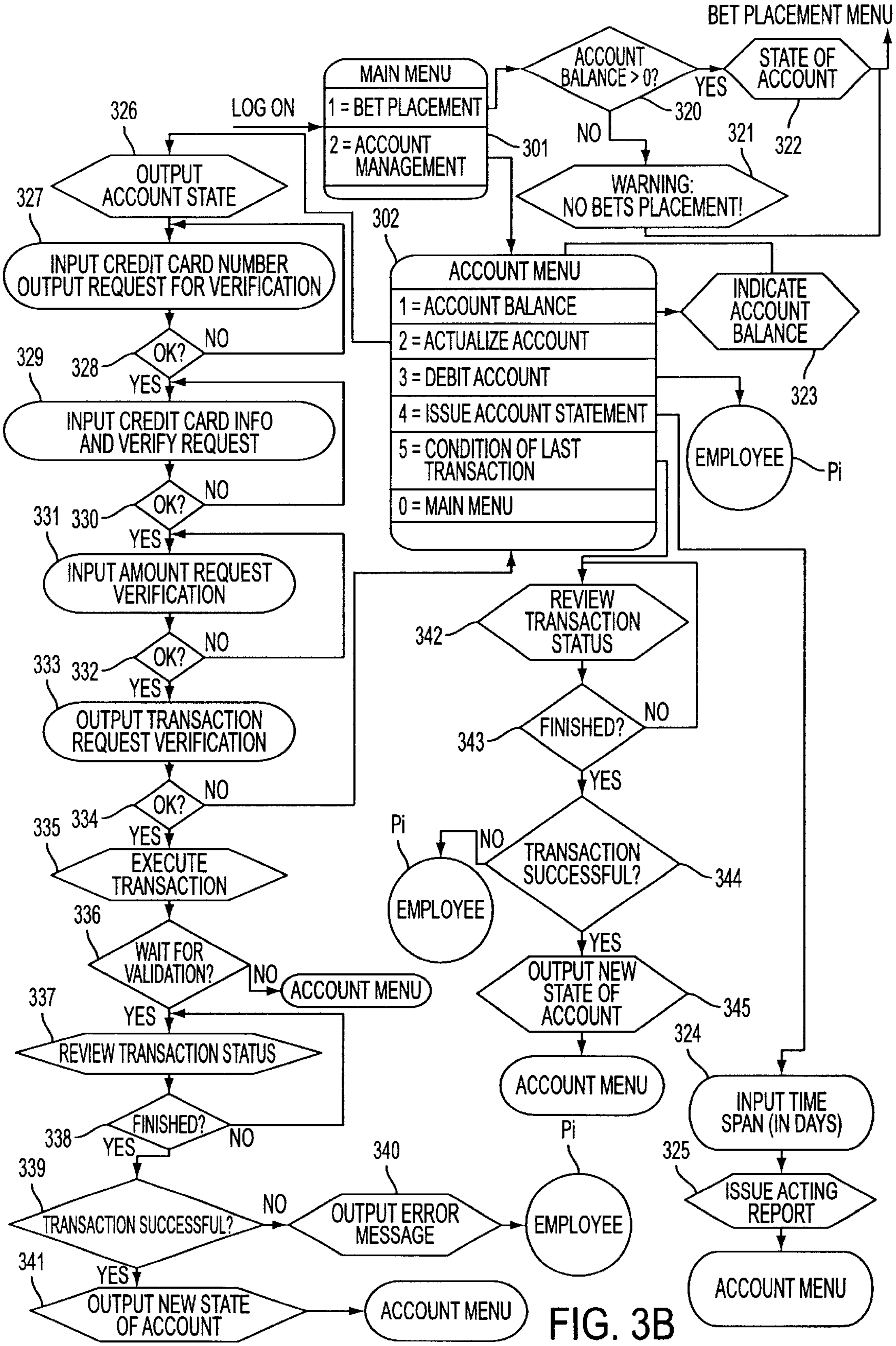
Figure 3C:
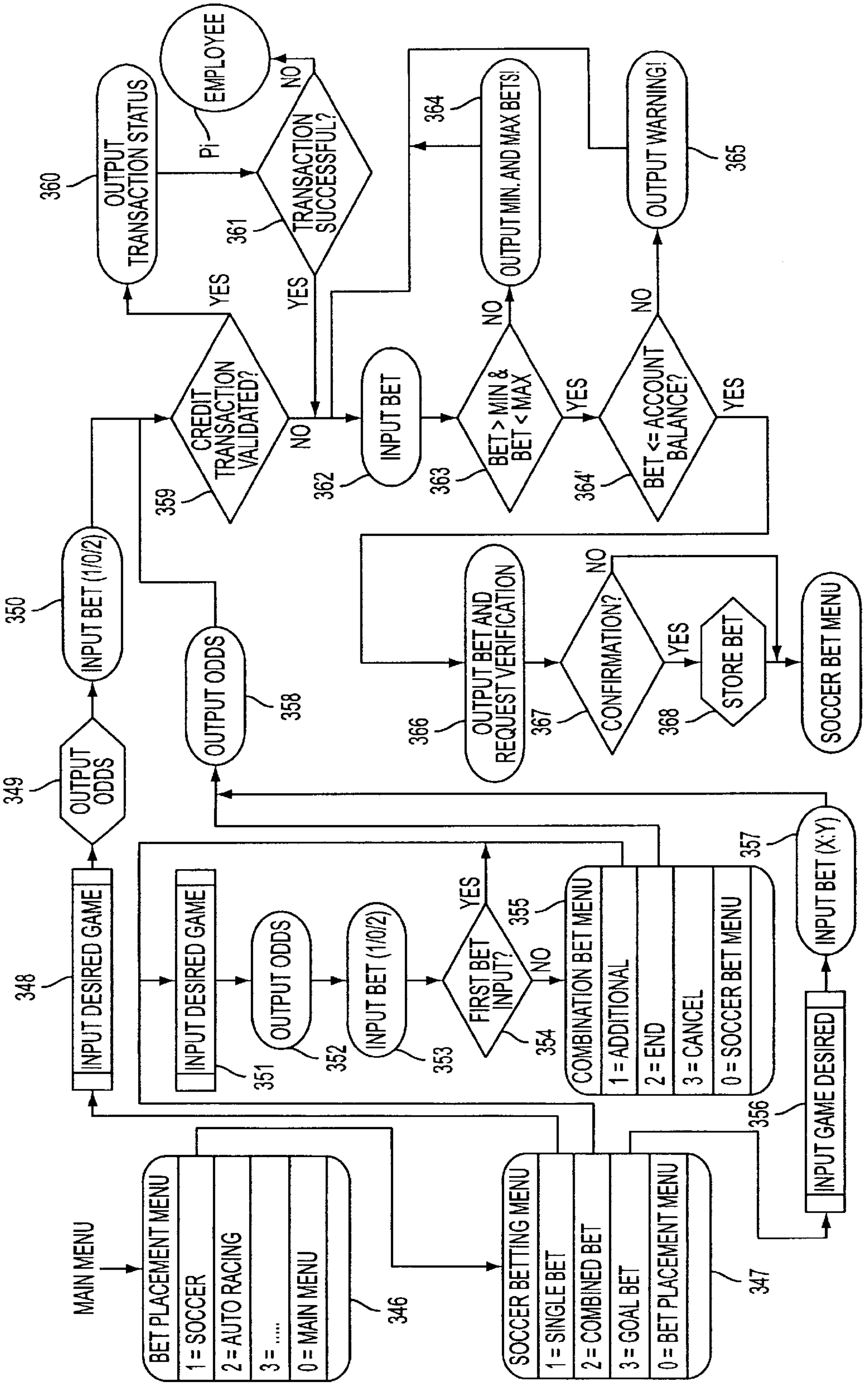
Figure 4A:
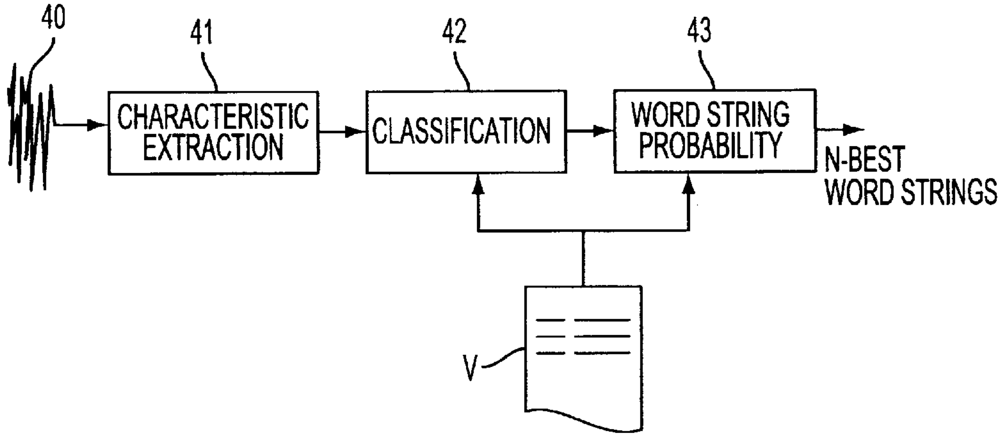
Figure 4B:
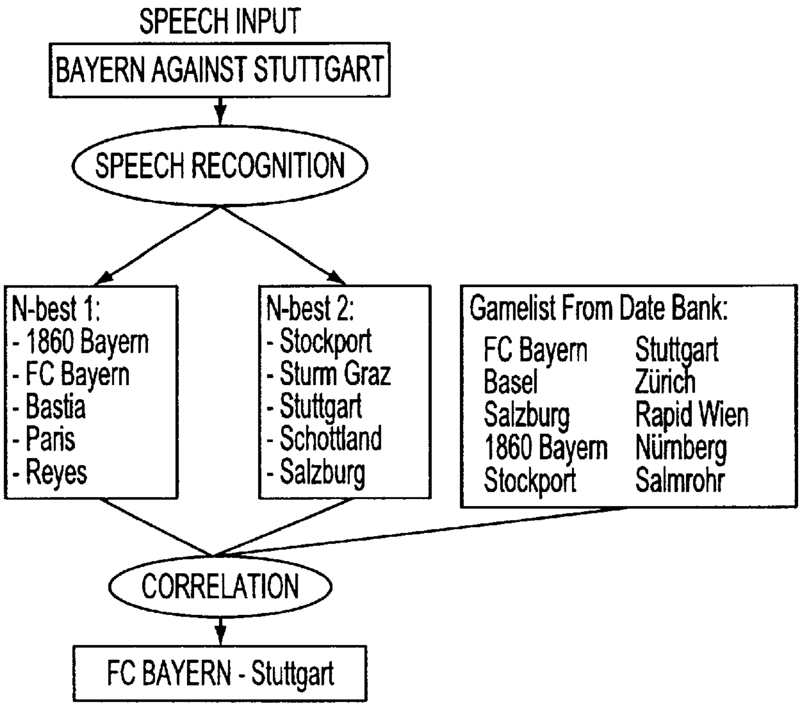
Figure 5:
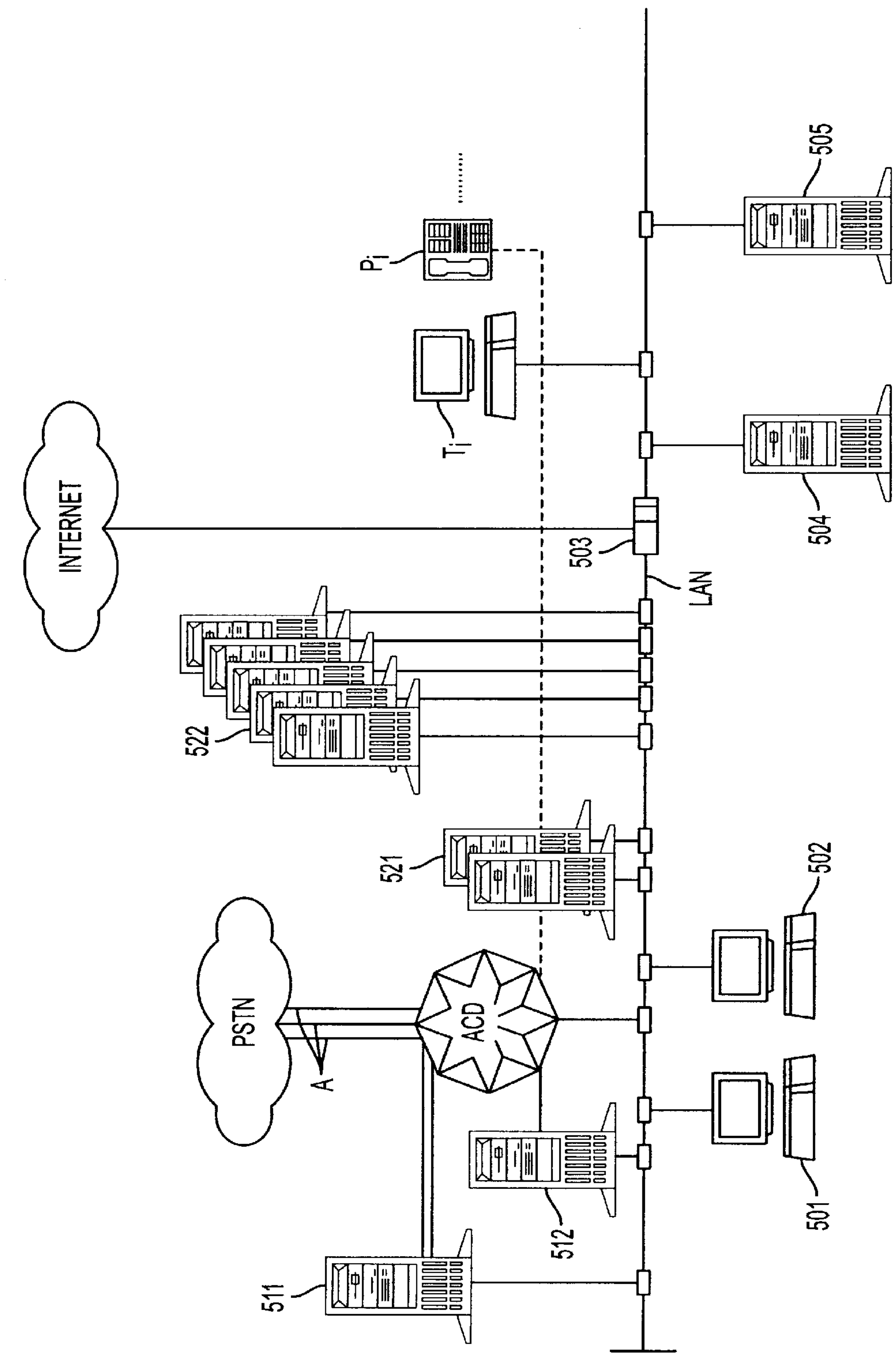

FIGS. 3*a* to 3*c* are flow diagrams of the method in accordance with the invention;

FIG. 4*a* is a block diagram of a speech recognition method known per se;

FIG. 4*b* is a flow diagram of the speech recognition method practiced by the invention; and FIG. 5 is the block diagram of a practical form of executing the computer system in accordance with the invention.

DETAILED DESCRIPTION OF PREFERRED EMBODIMENTS

In the drawings reference characters are used which in part serve as direct abbreviations of the functions executed by the thus labeled components. Appendix 2 contains a list of the used abbreviations.

Figure 1:
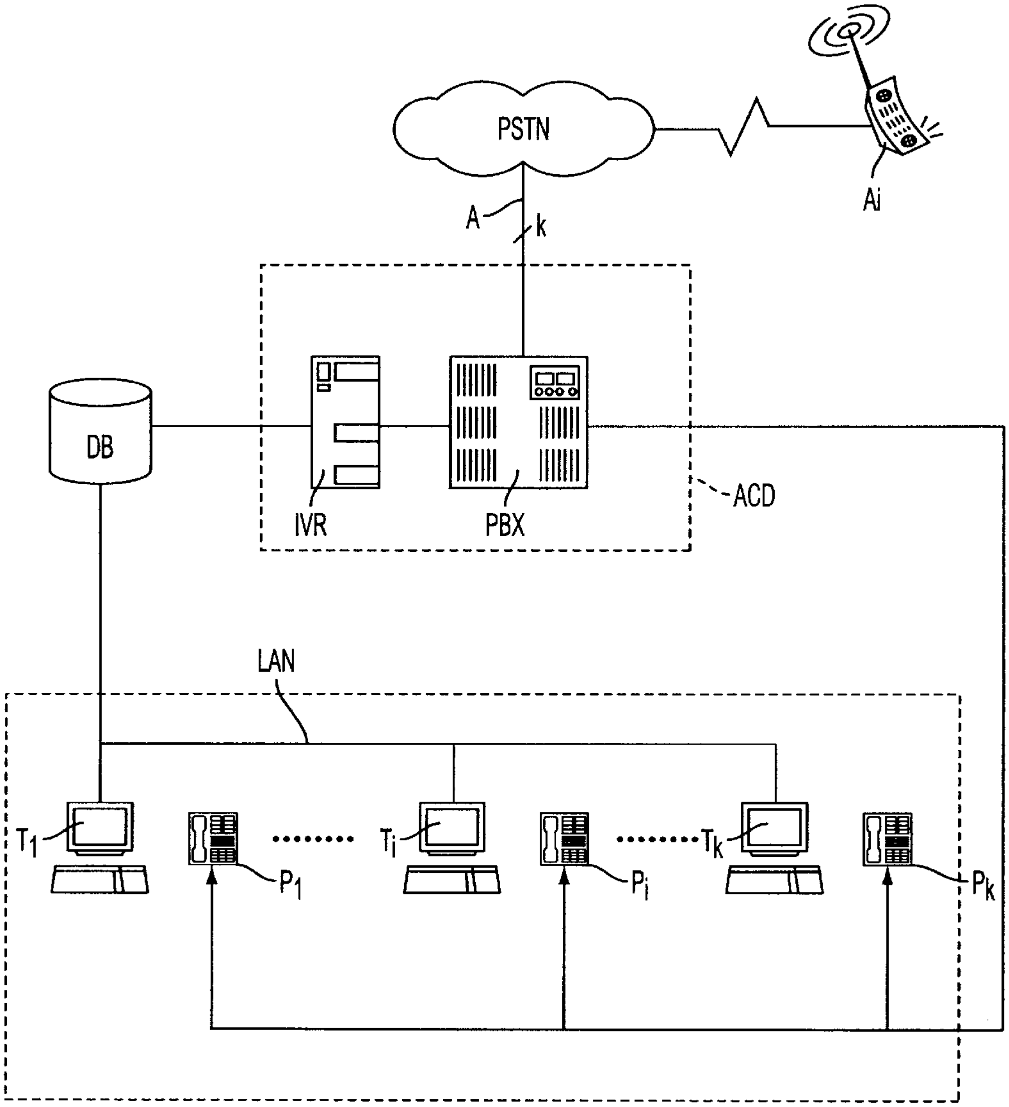
FIG. 1 (PRIOR ART)
FIG. 1 is a block diagram of a telephone assisted betting game or game of chance according to the prior art.

FIG. 1 schematically depicts the structure of a known computer-assisted system for processing bets or games of chance over the telephone. Call distribution means ACD are connected to the public telephone net PSTN by way of K official lines A. In the case shown, the call distribution means ACD are composed of a branch or extension device PBX and an interactive voice response module IVT which issues speech menus and messages and which may optionally be controlled by push button inputs of a caller $A_i$. The call distribution means ACD distributes incoming calls to a number K of listening and speaking terminals $P_1$ to $P_K$, three of which have been shown by way of example.

Employees at the work stations $P_1$ receive calls and input data in, or read data from, data stations $T_1$ to $T_K$. The data stations $T_1$ to $T_K$ are connected to a data base DB. The call distribution means ACD may also be connected to the data base, for instance for distributing calls to the listening and speaking terminals $P_1$ to $P_K$ in accordance with predetermined priorities.

The configuration of FIG. 1 as a computer-assisted call center architecture is known and requires K occupied work stations.

Figure 2:
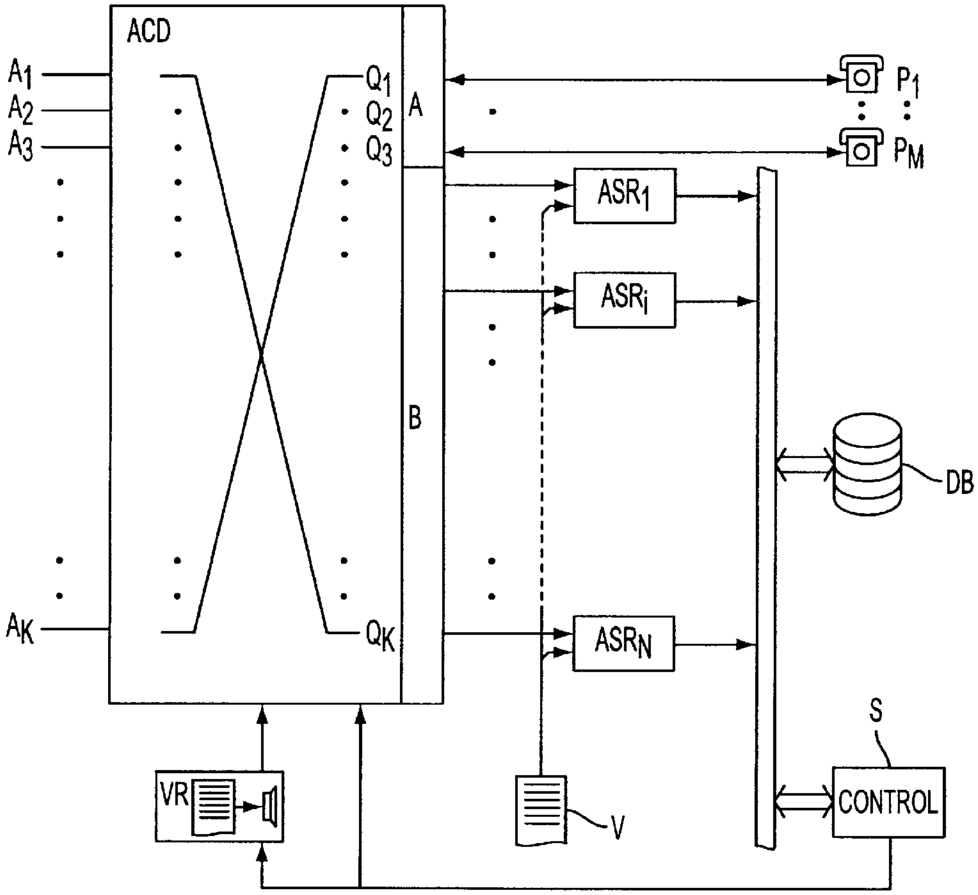
FIG. 2 is a schematic block diagram of the system in accordance with the invention.

FIG. 2 depicts the computer system in accordance with the invention. Here, too, the call distribution means ACD is connected to the public telephone net (not shown) by way of K official lines $A_1$ to $A_K$. The call distribution means distributes incoming calls in a controlled manner to be described in detail to K processing queues $Q_1$ to $Q_K$. The call distribution means ACD makes the basic decision of whether to direct calls to a set A of M listening and speaking terminals $P_1$ to $P_M$ or to a set B of N speech recognition modules $ASR_1$ to $ASR_N$.

The processing queues $Q_1$ to $Q_K$ may be holding or waiting queues operating on a stack reduction principle, e.g. first in—first out, or merely connection channels in which case the call distribution means ACD operates as a branch or extension unit.

The number of outgoing queues or channels $Q_1$ to $Q_K$ need not be the same as the number of incoming official lines $A_1$ to $A_K$, but it may, for instance, be less so that more than one caller may be in any one processing queue.

The control of the call distribution means ACD in respect of calls directed to set A or set B depends upon an automatic evaluation of a selection made by the caller, that is to say whether he wishes to place a bet (set B) or whether he is requesting a winning (set A).

In a first variant this selection may be made by the caller by way of push button inputs (MFV or DTMF) which are then evaluated by the call distribution means ACD. The call distribution means ACD may evaluate, for example, the final digits of a telephone number dialed by the caller, in the manner of direct dialing of an extension.

In a second variant, the selection is made by the caller by way of a voice command. For this purpose, special speech recognition modules (not shown) may be used which are provided in the call distribution means ACD. However, preference is given to those speech recognition modules $ASR_1$–$ASR_N$ which are also utilized for conversion of spoken bet placements to be described. In cooperation with a control S and one or more speech recognition modules VR connected to the call distribution means ACD, the caller may, for instance, be requested to input a selection.

It will be understood that the arrangement of the control is but exemplary; the control S may also be arranged in one of the components ACD, ASR, DB or VR, or it may be distributed over all of them as is well-known in computer technology.

The speech recognition modules $ASR_i$ of set B convert bet placements spoken by the caller into machine processable sets of data and store them in a data base DB. The spoken bet placements may be present in a single uninterrupted speech string or—by appropriate request from the speech response module VR—in several individual speech strings.

Each bet placement includes at least one caller identification and an identification of the selected game. In the case of wagering, the bet placement further includes the wagering bet and the size of the bet.

The spoken bet placements are detected in each speech recognition module $ASR_i$ by comparison with one or more sets V of predetermined speech component patterns such as phonemena, syllables, words etc. fed to the speech recognition modules $ASR_i$.

FIG. 4*a* schematically depicts the sequence of a speech recognition method known per se. In a first step 41 significant characteristics are extracted from digital speech data 40, for instance by division into frames, sectional Fourier transformation and subsequent extraction of predetermined speech-relevant frequencies. The characteristics of a frame constitute a characteristic vector.

In a second step 42 the characteristic vectors of the speech frames are classified, for instance, in accordance with phonemena by recourse to predetermined sets V of speech component patterns.

In a third step 43 there will take place a propability evaluation of possible word strings. Here, too, recourse is had to the stored sets of speach component patterns V. The Hidden-Markov-Model is a known model of propability evaluation. The N probable word strings are available at the end of the process.

Reference may be had to Shaughnessy, O.: Speech Communication, Human and Machine, Addison-Wesley, Reading, Mass., 1990 and Schukat-Talamazini, E. G.: Automatische Spracherkennung-Grundlagen, statistische Modelle und effiziente Algorithmen, Vieweg, Braunschweig, 1995 for a detailed summaries of processes and methods of speech recognition.

The recognition rate of the method may be further enhanced by correlation of N best lists of neighboring words by comparision with predetermined possibilities of word combinations. This method is described in greater detail on the basis of the example of FIG. 4*b* relative to the voice input “Bayern gegen Stuttgart” (“Bavaria v. Stuttgart”).

The speech recognition method isolates the two team words and returns a N best list of the recognized teams, sorted on the basis of the possibilities of hits. Unclear or dialect-laden pronunciation or the uncertainty of speech recognition in general may lead to one or both teams not being placed in the top position of the column. For optimization, the list from the data bank of all offered games is referred to. The recognition rate can be markedly improved by this correlation evaluation as compared to the sole recognition of individual words.

The scores of games of chance or wagerings are recorded in the data base by terminals (not shown), and they are linked to the mentioned data sets for calculation of corresponding winnings. The scores and winnings may be requested by the caller over the same system.

By way of terminals (not shown) the contents of the data bank DB are also available at the listening and speaking terminals $P_1$ to $P_M$ for the verification of winning requests, addition of addresses to the data bank, and for causing payments to be made or to be authorized. Payments may thereafter be made in any desired manner, such as, for example, by way of an online connection between a network of local business centers with the data base. Alternatively, the computer system could execute credit card, bank account and similar transactions.

A concrete embodiment of the method in accordance with the invention will now be described in greater detail with reference to FIGS. 3*a* to 3*c*. FIG. 3*a* essentially depicts the first voice menu section for processing the application in the system; FIG. 3*b* depicts the voice menu for managing the betting account by the user, and FIG. 3*c* depicts the voice menu of bet placement.

In the ensuing description “inputs” will be understood to be voice inputs, except were stated otherwise, and “outputs” or “requests” always refers to voice outputs.

The basic decision between directing the call to one of the listening and speaking terminals $P_i$ of set A in case of a request for a winning or to one of the speech recognition modules of set B in case of placing a bet, is made by the main menu 301 and by option 3 of the account menu 302 (FIG. 3*b*): Following a preceding optional logon operation, FIG. 3*a*, the caller selects between placing his bet (option 1 of the main menu 301) and requesting a winning (option 2 of the main menu 301 as well as option 3 of the account menu 302). In the first case a connection is made to the bet placements (FIG. 3*c*); in the second case connection is made to the listening and speaking terminal $P_i$.

Beginning at FIG. 3*a*, upon receipt of a call, an examination will be made in block 303 for determining whether a caller identification (CLID) transmitted by the public telephone net is available and registered. In the affirmative, the caller is requested in block 304 to input a password (PIN), and in block 305 the authenticity of the completed caller identification consisting of CLID, which hereafter will also be used as an account number, and password (PIN) is examined. If affirmative, a connection will be established to the main menu 301.

If block 305 rejects the caller identification, two renewed admission attempts will be permitted in a queue by way of the blocks 306, 307 and 304, block 306 counting the number of attempts and block 307 allowing the explicit input of an account number instead of the CLID. After three invalid admission attempts block 306 directs the call to an employee at a listening and speaking terminal $P_i$.

In case block 303 determines that no CLID is available or registered, blocks 308 and 309 issue an input menu stating available options 1=logon, 2=new customer registration, 3=explanation and 4=employee. Option 1 of the menu leads to block 307, and option 2 leads to blocks 311 to 318 for generating a new caller identification.

Following an introductory explanation in block 311, the generation of a new caller identification is incumbent upon selecting a currency in block 312, statement of age in block 313 and upon checking the age in block 314; in the case of minors the call will be terminated. Otherwise, a new account number and a new password (PIN) will be generated in block 315, issued in block 316, and, in block 317, the question is asked if the issuance has been understood. If affirmative, the caller may leave additional information in block 318; this is recorded as a voice message without further processing. Thereafter, connection is established to the CLID or account number input 307.

Following a successful application in the system continuation takes place at the main menu 301 of FIG. 3*b*. Option 1 of the menu 301 is the selection "bet placement" and initially connects to a block 320 which checks whether the betting account of the caller has a credit balance. In case of no credit balance, a warning will issue in block 321 to the effect that no bets may be placed. However, in order to give new customers the possibility of becoming familiar with the system before making a deposit one may nevertheless proceed to the betting menu of FIG. 3*c*. In that case, the actual placing of a bet remains blocked, however.

If there is a credit balance, the state of the account will be indicated in block 322, and the system proceeds to the betting menu of FIG. 3*c*.

If the caller selects option 2=account management from the main menu 301 the system branches off to the account menu 302. This offers options 1=identify account balance (by way of block 323), 2=actualize account (see supra), 3=debit account or request for payment of winning (see supra), 4=issue account statement and 5=identify condition of last transaction.

Once the time period of interest has been entered in block 324, option 4 provides an activity report of the account in block 325.

The account may be actualized in option 2 by a charge to a credit card, bank transfer or the like. Following indication of the state of the account in block 326, there is a possibility of entering a credit card or bank account number or the like (e.g. value card dates, voucher numbers, identification for a electronic species, etc.) after verifying (328) of an amount to be debited in block 331. After renewed verification (332) the entire transaction is repeated in block 333, reconfirmation is expected in block 334, and the transaction is executed in block 335.

Every credit card charge, bank account deduction transaction or the like is stored in the data base. A credit card, bank account or the like gateway connected to the data base will, either by request or regularly (polling), check all pending transactions waiting to be validated for their credit worthiness by interaction with a credit card issuer, bank or the like, as is well known to technology.

In block 336, the caller is offered the possibility of waiting or not waiting for the validation. If he waits, the queue 337–338 will remain open until the transaction has been verified or validated. In case the validation is positive, block 339 connects to block 341 where the new state of the account is indicated; otherwise connection is made with block 340 for an error message and for redirecting the call to a work station $P_i$.

Option 5 enables subsequent checking of the state of the transaction; blocks 342 to 345 essentially correspond to blocks 337 to 341.

FIG. 3*c* depicts the sequence of placing a bet, beginning with the bet placement menu 346. In the bet placement menu 346 the type of bet, game of chance or lottery may be selected as a first step. The example shows several kinds of sports bets, that is to say, option 1=soccer betting; option 2=automobile race betting, etc.

Soccer bet option 1 is depicted in greater detail and branches off to a soccer betting menu 347. These are different types of bets, namely a single bet option 1, a combination bet option 2 and a goal bet option 3.

In block 348, the single bet option 1 requests entry of the desired game; this speech input has already been described supra with reference to FIG. 4*b*. Thereafter, the odds of winning will be indicated in block 349, and in block 350 a request is issued for inputting the desired bet 1, 0 or 2.

The combination bet in blocks 351 to 355 consists of the successive inputs of several single bets, blocks 351 to 353 corresponding to blocks 348 to 350 of the single bet; queue control is exercised by blocks 354 and 355.

The goal bet 356 also request input of the desired game, analoguously to block 248, and the desired bet may be inputted in block 357.

After a combination bet or a goal bet, the odds are indicated in block 358.

All three options lead to block 359 which checks whether entered credit card charge, bank account transfer or the like has been validated. In the affirmative, the system proceeds to block 360 where the status of the transaction is indicated. In case of a negative result, block 361 diverts the call to a work station $P_i$. Otherwise, or if no transaction was pending, a request for placing a bet is issued in block 362.

Block 363 checks whether the bet is within predetermined limits. If it is not, the minimum and maximum bets are indicated in block 364 and a renewed request for placing a bet will be issued.

Otherwise block 364' checks if the stake is covered by the bet account. If this is not the case, block 365 will issue a warning and establish a renewed connection to block 362.

If the result of the check is positive, blocks 366 and 367 again request confirmation. If the confirmation is given, block 368 stores the placed bet as a set of data in the data base.

FIG. 5 depicts a practical form of realization of the system. A telecommunications device, type Alcatel 4400, is connected to the public telephone net PSNT, and acts as call distribution means ADS, by way of three ISDN basic connections A which include 30 official lines each.

Two IVR master servers 511 and 512 are connected to the ACD for performing interactive speech response functions and implementing the functions of modules VR and S of FIG. 2. These servers may also perform simple speech recognition methods such as the recognition of individual numbers or letters.

The IVR master servers 511 and 512 as well as the call distribution means ACD are connected to each other and to other components of the system by way of a LAN. These include a management terminal 501 for managing as well as an applications terminal 502 for programming the system.

Complex and calculation-intensive speech recognition methods of the kinds performed by blocks 348, 351 and 356 are moved to slave server clusters 521 and 522. This allows simple scaling of the calculation power.

The system may also be connected to the internet by way of a firewall hub 503.

The work stations of the employees or call agents are also connected to the LAN, each including a terminal $T_i$ and a listening and speaking terminal $P_i$. The data base is implemented by an SQL server 504. A gateway server 505 constitutes the gateway for validating credit card charge, bank account deduction transactions or the like and is connected to one or more credit card issuers, banks or the like by a connection (not shown).

Programming of the entire system is done modularly, for instance, by way of graphic development tools for setting up IVR applications, such as, for instance, the AVIOLA application generator software available from Alcatel. The speech recognition software used in the slave server clusters 521 is the software-based product L&H ASR 1500/TSO of Lernout and Houspie. This p[roduct is capable of speaker-independ recognition of an active vocabulary of about 500 words in six different languages at a recognition rate of 95%.

The SQL data base managed by the SQL server 504 is based upon the 6.5 SQL server of Microsoft. In order to abstract access of the described programs on the data base the functions listed in the following Table 1 were defined as interfaces to the data base and implemented as stored procedures.

TABLE 1

| Function | Description |
|---|---|
| SP_GetSpofNoWeek | Furnishes the bet number based on week and game number |
| SP_GetAccount | Searches the bet account number based on caller ID |
| SP_Logon | Applying with bet account number and PIN Code |
| SP_CreateAccount | Setting up a new bet account for new customers |
| SP_GetBalance | Furnishes state of account of a bet account |
| SP_PayIn | Deposit to the bet account by credit card |
| SP_CheckTrans | Checking a credit card transaction |

TABLE 1-continued

| Function | Description |
|---|---|
| SP_GetCBHistory | Furnishes a summary of placed combination bets |
| SP_GetSMHistory | Furnishes a summary of placed single bets |
| SP_GetPayHistory | Furnishes a summary of deposits and disbursements of the bet account |
| SP_GetSpofNo | Furnishes bet number based on team name |
| SP_GetOdds | Furnishes quota about a bet |
| SP_PlaceSMBet | Placing of a single bet |
| SP_GetCBOfferNo | Furnishes the bet number of a combination bet |
| SP_GetStakeAmt | Furnishes minimum and maximum stakes for a bet |
| SP_PlaceGoalBet | Placing of a goal bet |
| SP_PlaceCBBet | Placing of a combination bet |
| SP_GetOpenMatches | Furnishes a list of all open games and teams |

Access to these function may be established by use of an ODBC driver of almost any system. Such drivers are available for many types of operating systems. The exact specification of the parameters of the procedures listed in Table 1 are listed in Appendix 1.

The data base enables complete recording of all user activities. If desired, all incoming calls may be recorded as speech strings in the data base (voice logging).

The invention may be used in all types of bets, games of chance, lotteries, telephone games or the like and is, of course, not limited to the embodiments described, but embraces all variants which fall into the scope of the appended claims.

APPENDIX 1

| Definition of the Data Base Interface | |
|---|---|
| 1) SP_GetSpofNoWeek | |
| Input Parameters | @weekno (int)/@coupmatchno (int) |
| Output Parameters | @betofferno (int) |
| Return Code | 0 = Success/1 = Failure |
| Result Set | None |
| 2) SP_GetAccount | |
| Input Parameters | @callerid (varchar(30)) |
| Output Parameters | @accountno (latest for stated caller id) (int) |
| Return Code | 0 = Success/1 = Failure |
| Result Set | None |
| 3) SP_Logon | |
| Input Parameters | @accountno (int)/@pinno (varchar (5)0/ @callerid (optional) (varchar (30))/ |
| Output Parameters | @language (varchar (8)) (if no account exists, return empty string) |
| Return Code | 0 = Success/1 = Failure |
| Result Set | None |
| 4) Sp_CreateAccount | |
| Input Parameters | @DOB (varchar (11))/@language (default German) (varchar (8))/@currency (char (3))/@caller id (optional) (varchar (30)) |
| Output Parameters | @accountno (int)/@pinno (char (5)) |
| Return Code | 0 = Success/1 = Failure |
| Result Set | None |
| 5) SP_GetBalance | |
| Input Parameters | @accountno (int) |
| Output Parameters | @currency (char(3))/@balance (int) |
| Return Code | 0 Success/1 = Failure |
| Result Set | None |
| 6) SP-PayIn | |
| Input Parameters | @credcardno (varchar(30))/@expdate (int)/ |
| Output Parameters | @transcode (int) |
| Return Code | 0 = Success/1 = Failure |
| Result Set | None |
| 7) SP_CheckTrans | |
| Input Parameters | @transcode (int) |
| Output Parameters | @state (smallint) |
| | 0 = rejected/invalid card number |

APPENDIX 1-continued

| Definition of the Data Base Interface | |
|---|---|
| | 1 = rejected/internal error<br>2 = not processed<br>3 = successfully processed |
| Return Code | 0 = Success/1 = Failure |
| Result Set | None |
| 8) SP_GetCBHistory | |
| Input Parameters | @accountno (int)/@datefr (datetime) |
| output Parameters | none |
| Return Code | 0 = Success/1 = Failure |
| Result Set | Details of combination bet as follows:<br>Bet number date betname<br>Stake: stake Prize: winnings<br>Status: state Result: (correct/false)<br>(List of the single bets compounded in this list)<br>bet number match name date<br>Bet: option Chance: odds Status: state |
| 9) SP_GetSMHistory | |
| Einput arameters | @accountno (int)/@datefr (datetime) |
| Output parameters | none |
| Return Code | 0 = Success/1 = Failure |
| Result Set | Details of bets as follows:<br>Bet number date betname<br>Bet option Chance odds Stake: stake<br>Prize: winnings Status: state<br>Result: (correct/false) |
| 10) Get_PayHistory | |
| Input Parameters | @accountno (int)/@datefr (datetime) |
| Output Parameters | None |
| Return Code | 0 = Success/1 = Failure |
| Result Set | Details of payment as follows:<br>date type of payment<br>fund customer balance |
| 11) SP_GetSpofNo | |
| Input Parameters | @team1 (varchar (30))/@team2 (optional) (varchar (30))/@matchdate (optional) (varchar (12)) |
| Output Parameters | None |
| Return Code | 0 = Success/1 = Failure |
| Result Set | Details of each game from input parameter;<br>The details of each game correspond to a line in the result set and contain game name, bet offer number and game date. |
| 12) SP_GetOdds | |
| Input Parameter | @betofferno (int) |
| Output Parameter | none |
| Return Code | 0 = Success/1 = Failure |
| Result Set | List of options and odds for the bet offer number. Includes goal bets and single bets. The columns in the result set are as follows: Odds/Option. |
| 13) SP_PlaceSMBet | |
| Input Parameter | @betofferno (int)/@optinono (smallint)<br>@stake (int)/@accountno (int) |
| Output Parameter | @reterncode (smallint)<br>1 = bet placed successfully<br>2 = Bet closed |
| Return Code | 0 = Success/1 = Failure |
| Result Set | None |
| 14) SP_GetCBOfferNo | |
| Input Parameter | none |
| Output Parameter | @combobetofferno (int) |
| Return Code | 0 = Success/1 = Failure |
| Result Set | None |
| 15) SP_GetStakeAmt | |
| Input Parameter | @spofno (int)/@accountno (int) |
| Output Parameter | @maxstake (int)/@minstake (int) |
| Return Code | None |
| Result Set | 0 = Success/1 = Failure |
| 16) SP_PlaceGoalBet | |
| Input Parameter | @predictedscore (varchar (30))/<br>@betofferno (int)/@stake (int)/<br>@acctno (int) |
| Output Parameter | @returncode (smallint)<br>1 = bet successfully placed<br>2 = bet closed |

APPENDIX 1-continued

| Definition of the Data Base Interface | |
|---|---|
| Return Code | 0 = Success/1 = Failure |
| Result Set | None |
| 17) SP_PlaceCBBet | |
| Input Parameter | @cbbetofferno (iinti)/@accountno (int)/<br>@smbetofferno (varchar (50)) (Numbers linked by "*")/@optinos (varchar (20)) (linked by "*")/@stake (int) |
| Output Parameter | @returncode (smallint)<br>1 = bet placed successfully<br>2 = bet closed |
| Return Code | 0 = Success/1 = Failure |
| Result Set | None |
| 18) SP_GetOpenMatches | |
| Input Parameter | @fnweek (int) |
| Output Parameter | none |
| Return Code | 0 = Success/1 = Failure |
| Result Set | Each line contains match name, team 1 and team 2 in this match |

APPENDIX 2

| List of Abbreviations | |
|---|---|
| ACD | Call distribution means |
| ASR | Automatic speech recognition |
| CLID | Caller identification |
| CSTA | Computer supported telecommunications architecture |
| DTMF | Dual tone multiple frequency |
| IVR | Interactive voice response |
| LAN | Local area network |
| ODBC | Open data base connectivity |
| PBX | Private branch exchange |
| PIN | Personal identification number |
| PSTN | Public switched telephone network |
| SQL | Structured query language |
| VR | Voice response |

What is claimed is:

1. A method of processing over the telephone net bets and games of chance including placements of bets and requests for winnings utilizing a computer system connected to the telephone net and to which are connected a data base and listening and speaking terminals, comprising the steps of:

making available in the data base a first limited set of predetermined speech component patterns forming potential bet placements;

taking up a received call via the computer system;

automatically evaluating the caller identification of a caller;

making available in the data base a further limited set of predetermined speech component patterns forming possible spoken credit card charge, bank account deduction transactions or the like;

converting a spoken credit card charge or bank account deduction transaction or the like by the caller received during initial caller enrollment or during bet placement, by a speech recognition method that performs a comparison with the further set of speech component patterns, into a machine-processable transaction set that is automatically stored in the data base together with the caller identification without referral of the caller to a listening and speaking terminal; and, recognition of a selection by the caller between placing a bet on the one hand or a winning request on the other hand and, dependent upon the recognition, optionally converting one or more spoken bet placements by the caller by means of a speech recognition method which performs a comparison with the first set of speech component patterns into a machine-processable set of data and storing the set of data together with the customer identify in the data base or directing the call to a listening and speaking terminal in case of a winning request.

2. The method of claim 1, wherein in case of a non-evaluatable or non-existing caller identifications, a new caller identification is generated and issued by voice.

3. The method of claim 1, wherein the automatic evaluation of the caller identity is performed on the basis of a telephone number of the caller transmitted by the public telephone net.

4. The method of claim 1, wherein the automatic evaluation of the caller identification is carried out with the aid of a speech recognition method which performs a comparison with another limited set of predetermined speech component patterns forming possible spoken caller identifications.

5. The method of claim 4, wherein the caller identification includes an account number and a password.

6. The method of claim 1, wherein selection in by the caller is performed by of speech output and speech recognition.

7. The method of claim 1, wherein the transaction sets are checked for credit worthiness by way of a credit card charge, bank account deduction transaction terminal or the like.

8. The method of claim 1, wherein the selection by the caller is performed by a telephone dialing number transmitted by the telephone net.

9. A program for processing, over the telephone net, bets or games of chance including placements of bets and winning requests, for controlling a computer system connected to a telephone net and to which listening and speaking terminals are connected, including:

a data segment with a first limited set of predetermined speech compound patterns forming possible spoken bet placements;

a code segment for receiving an incoming call via the computer system;

a code segment for recognizing a selection by the caller between placing a bet and requesting winnings and optionally, depending upon the recognition, in case a bet is placed converting, with the aid of a speech recognition method which performs a comparison with the first set of speech component patterns, one or more spoken bet placements by the caller into a machine-processable set of data and storing it in the data base together with the caller identification, or in case of a winning request directing the caller to one of the listening and speaking terminals;

a data segment with a further limited set of predetermined speech component patterns forming possible spoken credit card charge, bank account deduction transactions or the like; and, a code segment for converting a spoken credit card charge or bank account deduction transaction or the like by the caller received during initial caller enrollment or during bet placement, with the aid of a speech recognition method that performs a comparison with the further set of speech component patterns, into a machine-processable transaction set and for automatically storing the transaction set in the data base together with the caller identification and without referral of the caller to a listening and speaking terminal.

10. The program of claim 9, wherein the code segment for evaluating the caller identification includes a speech recognition method which performs a comparison with a second limited set of speech component patterns for forming possible spoken caller identifications.

11. The program of claim 10, further comprising a code segment for generating and voice issuing a new caller identification in case of a non-evaluatable caller identification.

12. The program of claim 9, further comprising a code segment for checking the sets of transactions in the data bank for credit worthiness.

13. The program of claim 9, wherein the code segment for recognizing the selection by the caller executes a speech output and a speech recognition.

* * * * *